(12) United States Patent
Kakadia et al.

(10) Patent No.: US 8,989,008 B2
(45) Date of Patent: Mar. 24, 2015

(54) WIRESPEED TCP PACKET WINDOW FIELD MODIFICATION FOR NETWORKS HAVING RADIO SEGMENTS

(71) Applicant: Verizon Patent and Licensing, Inc, Basking Ridge, NJ (US)

(72) Inventors: Deepak Kakadia, Union City, CA (US); David L Harris, Pleasanton, CA (US); Maria G Lam, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 172 days.

(21) Appl. No.: 13/661,884

(22) Filed: Oct. 26, 2012

(65) Prior Publication Data

US 2014/0119182 A1    May 1, 2014

(51) Int. Cl.
*H04W 28/10*    (2009.01)
*H04W 40/00*    (2009.01)

(52) U.S. Cl.
CPC .............. *H04W 28/10* (2013.01); *H04W 40/00* (2013.01)
USPC .......................................... 370/235; 370/328

(58) Field of Classification Search
CPC ..... H04L 47/193; H04L 69/163; H04L 47/27; H04L 47/30; H04L 47/40; H04W 80/06; H04W 28/02; H04W 24/02; H04W 28/0273; H04W 28/0278; H04W 40/00
USPC .......... 370/229, 230, 235, 236, 328, 332, 474
See application file for complete search history.

(56) References Cited

U.S. PATENT DOCUMENTS

| | | | |
|---|---|---|---|
| 6,219,713 B1 * | 4/2001 | Ruutu et al. | 709/235 |
| 6,594,246 B1 * | 7/2003 | Jorgensen | 370/338 |
| 6,687,833 B1 * | 2/2004 | Osborne et al. | 726/23 |
| 7,139,268 B1 * | 11/2006 | Bhagwat et al. | 370/389 |
| 7,380,006 B2 * | 5/2008 | Srinivas et al. | 709/227 |
| 2004/0215753 A1 * | 10/2004 | Chan et al. | 709/223 |
| 2005/0102412 A1 * | 5/2005 | Hirsimaki | 709/232 |
| 2005/0232193 A1 * | 10/2005 | Jorgensen | 370/329 |
| 2006/0268708 A1 * | 11/2006 | Speight et al. | 370/235 |
| 2008/0085717 A1 * | 4/2008 | Chhabra et al. | 455/450 |
| 2009/0279429 A1 * | 11/2009 | Griffoul | 370/230 |
| 2010/0029275 A1 * | 2/2010 | Bosch et al. | 455/436 |
| 2010/0189075 A1 * | 7/2010 | Iwamura et al. | 370/331 |
| 2010/0329135 A1 * | 12/2010 | Pelletier et al. | 370/252 |
| 2011/0222406 A1 * | 9/2011 | Persson et al. | 370/236 |
| 2011/0252281 A1 * | 10/2011 | Sridharan et al. | 714/48 |
| 2012/0269089 A1 * | 10/2012 | Morrill | 370/252 |
| 2013/0044595 A1 * | 2/2013 | Han et al. | 370/230 |
| 2013/0057705 A1 * | 3/2013 | Parker et al. | 348/184 |
| 2013/0114408 A1 * | 5/2013 | Sastry et al. | 370/231 |
| 2013/0155856 A1 * | 6/2013 | Zhang et al. | 370/235 |
| 2013/0176854 A1 * | 7/2013 | Chisu et al. | 370/241 |
| 2013/0286838 A1 * | 10/2013 | Zakrzewski | 370/235 |
| 2013/0294246 A1 * | 11/2013 | Geijer Lundin | 370/235 |
| 2013/0336213 A1 * | 12/2013 | Mimura et al. | 370/328 |
| 2014/0056128 A1 * | 2/2014 | Racz et al. | 370/229 |
| 2014/0254381 A1 * | 9/2014 | Racz et al. | 370/235 |

* cited by examiner

*Primary Examiner* — Paul H Masur
*Assistant Examiner* — Michael Phillips

(57) ABSTRACT

The transmission Control Protocol (TCP) may be optimized for a cellular network having a radio segment. A network device may receive state information relating to processing of traffic at a radio interface in a cellular network and receive packets transmitted by user equipment (UE). Based on the state information, the network device may modify a TCP window field of the received packets based on the state information. The network device may forward the modified version of the packets towards a destination indicated by a destination address field of the packets.

20 Claims, 9 Drawing Sheets

WIRESPEED TCP PACKET WINDOW FIELD MODIFICATION FOR NETWORKS HAVING RADIO SEGMENTS

BACKGROUND

Transmission Control Protocol (TCP) is a commonly used protocol, in the Internet Protocol (IP) suite, that provides data transmission services to application programs. For example, when an application program desires to send data, instead of breaking the data into smaller pieces and issuing a series of IP requests, the application program may issue a single request to a TCP component. The TCP component may, in turn, handle IP-related tasks associated with transmitting the data (e.g., breaking the data into smaller pieces and issuing multiple IP requests to transmit the data).

Due to network congestion, traffic load balancing, or other unpredictable network behavior, IP packets can be lost, duplicated, or delivered out of order. TCP components can detect these problems, request retransmission of lost data, and rearrange out-of-order data. Additionally, TCP components may implement congestion control algorithms to help minimize network congestion.

Existing TCP congestion control mechanisms may be designed for wireline transport, in which a varying amount of traffic is inserted into shared transport "pipes" that have a fixed bandwidth. Existing TCP congestion mechanisms may not work, or may not work effectively or optimally, when: (1) other traffic is inserted in the same wireline transport but does not implement some form of congestion control; or (2) the capacity of the transport changes at a faster rate than at which the TCP congestion control mechanism can detect congestion and take corrective action. Situation (2) may commonly occur in certain non-wireline transport segments, such as radio transport segments.

DETAILED DESCRIPTION OF PREFERRED EMBODIMENTS

The following detailed description refers to the accompanying drawings. The same reference numbers in different drawings may identify the same or similar elements.

Techniques described herein may provide for a TCP congestion control mechanism that is optimized for transport pipes that include a network segment over a radio access network (RAN). The TCP congestion control mechanism may be performed by a network device, such as a router, firewall, or other network device, that filters packets to potentially modify a TCP window parameter in the packets based on conditions that are present in a RAN segment of the TCP session. The filtering may be performed at wirespeed (e.g., in real-time and without introducing significant latency) and may thus be transparent to the endpoints associated with the TCP session. In one implementation, the TCP congestion control mechanism may be optimized for a Long Term Evolution (LTE) RAN.

Figure 1:
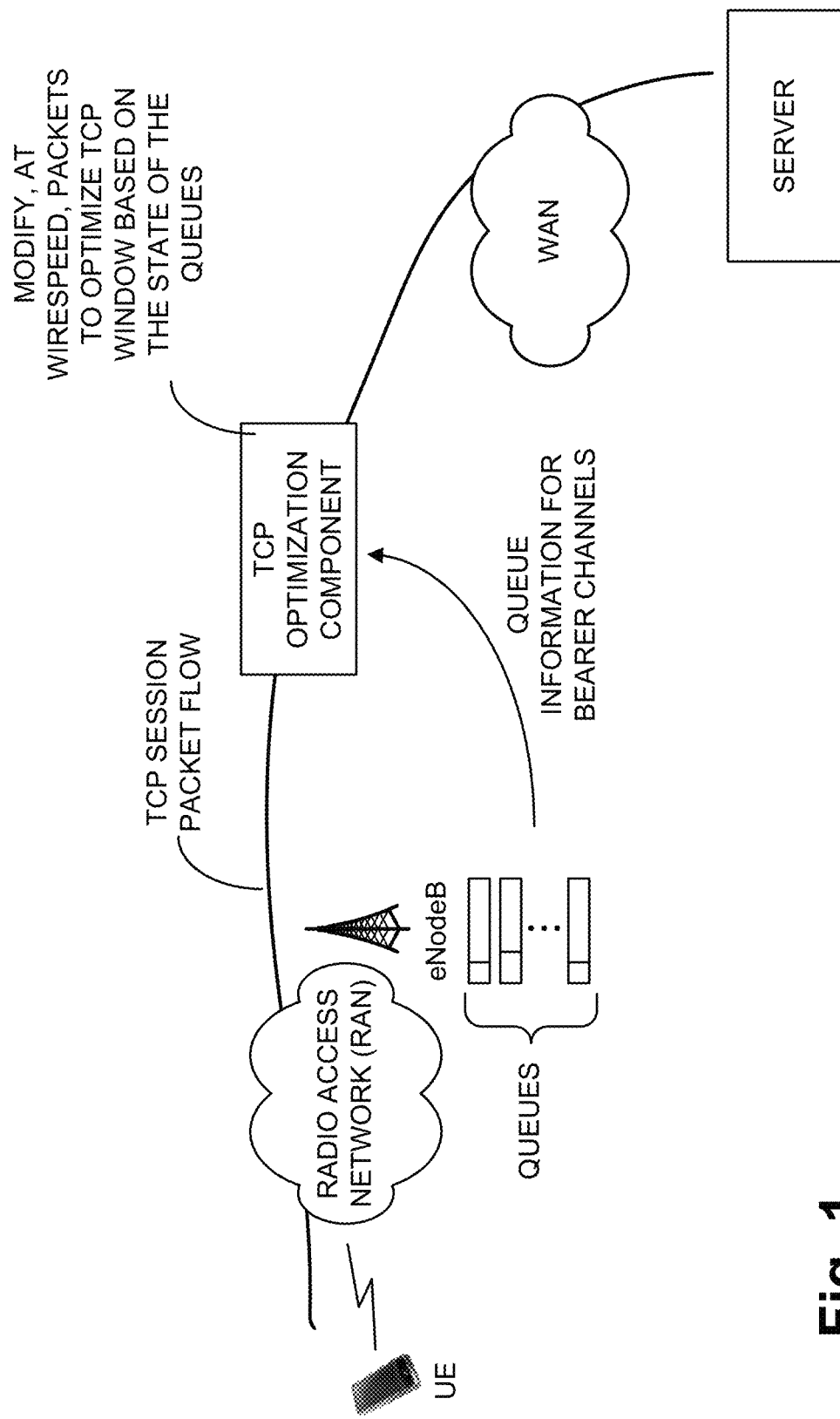
FIG. 1 is a diagram conceptually illustrating an example of an overview of concepts described herein.

FIG. 1 is a diagram conceptually illustrating an example of an overview of concepts described herein. As shown in FIG. 1, user equipment (UE), such as a mobile device, may communicate with a server as part of a TCP session (illustrated by the curved line between the UE and the server). The physical transport layer for the TCP session may span a number of different types of network segments, such as a RAN and a wide area network (WAN) (e.g., the Internet). The radio interface corresponding to the RAN may be implemented via a UE connecting, over a radio connection, to a base station (e.g., an eNodeB in an LTE network). The eNodeB may include queues that are used to buffer traffic before the traffic is transmitted to the RAN and to the UE.

A level of fullness for a particular one of the queues may generally represent a level of congestion in the RAN. For example, when a particular UE has a low-quality radio connection to the eNodeB, the queue, corresponding to that connection, may tend to become full as incoming packets for the particular UE are buffered before transmission over the RAN.

Consistent with aspects described herein, a TCP optimization component may filter packets in the TCP session to optimize the TCP session based on the state of the queues. The TCP optimization component may receive information relating to a state of the queues from the eNodeB. The TCP optimization component may, for example, determine whether to modify a TCP window parameter field in each packet, such as by decreasing the value of the TCP window parameter when a queue is congested The TCP window parameter may be used by the server, in accordance with the TCP protocol, when subsequently controlling the flow of packets transmitted to the UE. By modifying the TCP window parameter field, the TCP optimization component may indirectly control the flow of packets transmitted to the UE. In one implementation, packet filtering performed by the TCP optimization component may be performed at wirespeed. For example, the optimization component may be implemented using a field programmable gate array (FPGA), application specific integrated circuit (ASIC), or other hardware mechanism capable of efficiently and quickly processing packets.

The TCP optimization component, based on the queue state information from the eNodeB, may control the packet flow of a TCP session based on a direct indication of congestion/signal quality in the RAN. Because the RAN network segment is frequently a limiting factor in traffic flow for a TCP session, the traffic flow for the TCP session can be effectively optimized. The optimization may advantageously be performed by a device that is transparent to the operation of the endpoints of the TCP session (e.g., a UE and a server).

Figure 2A:
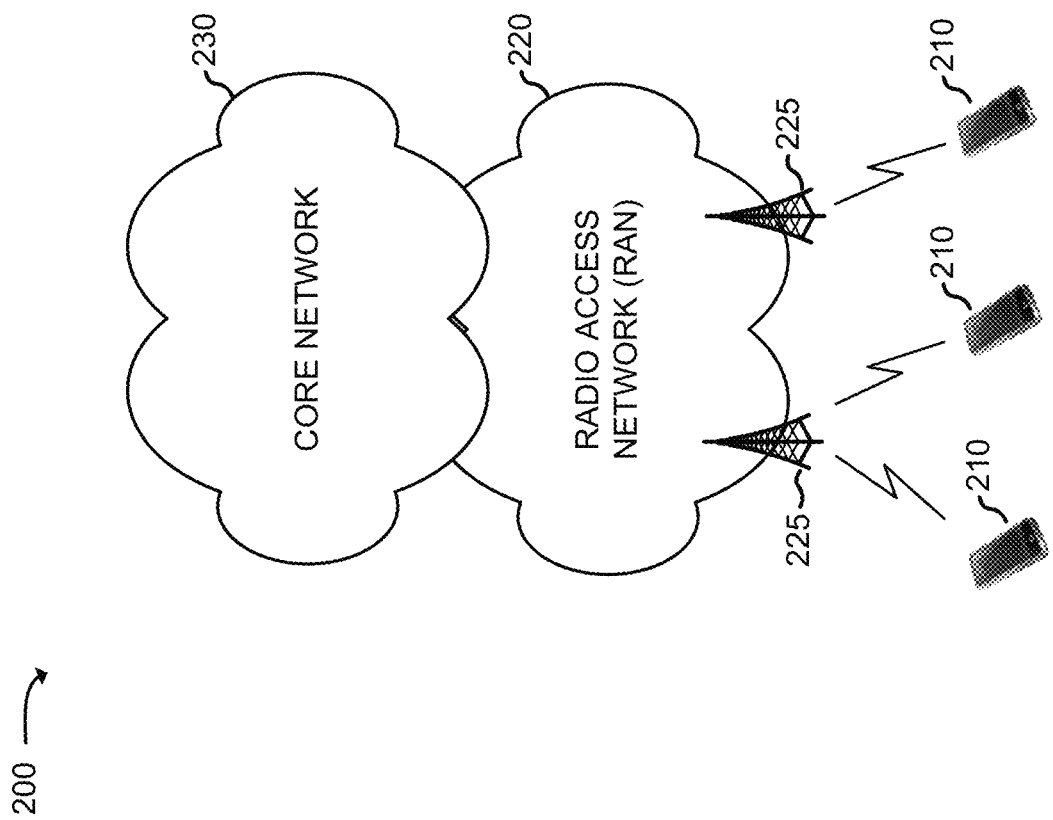
FIG. 2A is a diagram of an example environment in which systems and/or methods described herein may be implemented.

FIG. 2A is a diagram of an example environment 200 in which systems and/or methods described herein may be implemented. As illustrated, environment 200 may include one or more UEs 210, a RAN 220, and a core network 230.

UEs 210 may include portable computing and communication devices, such as a personal digital assistant (PDA), a smart phone, a cellular phone, a laptop computer with connectivity to a cellular wireless network, a tablet computer, etc. UEs 210 may also include non-portable computing devices, such as a desktop computers, consumer or business appliances, set-top devices (STDs), or other devices that have the ability to connect to RAN 120. UEs 210 may connect, through a radio link, to RAN 220. Through the radio link, UEs 210 may obtain data and/or voice services.

RAN 220 may include one or more devices that include radio interfaces to provide wireless connections to UEs 210. In one implementation, RAN 220 may include a radio access network for a cellular network, such as an LTE network. RAN 220, as illustrated, may include one or more base stations, which, in the context of an LTE network, may be referred to as an Evolved Node B (eNodeB) 225. Each eNodeB 225 may provide a radio interface over which the eNodeB may communicate with UEs 210. The radio interfaces provided by RAN 220 may include, for example, orthogonal frequency-division multiplexing (OFDM) and/or single-carrier frequency-division multiple access (SC-FDMA) SC-FDMA based radio interfaces.

Core network 230 may include one or more networks of any type, such as a local area network (LAN), a WAN, and/or a metropolitan area network (MAN). In one implementation, core network 230 may implement an LTE network. In this situation, core network 230 may be implemented using a flat, IP-based network architecture that includes one or more network devices or components that facilitate the providing of network access to UEs 210. Core network 230 may connect to one or more other networks, such as to the Internet, to provide network service to UEs 210.

Figure 2B:
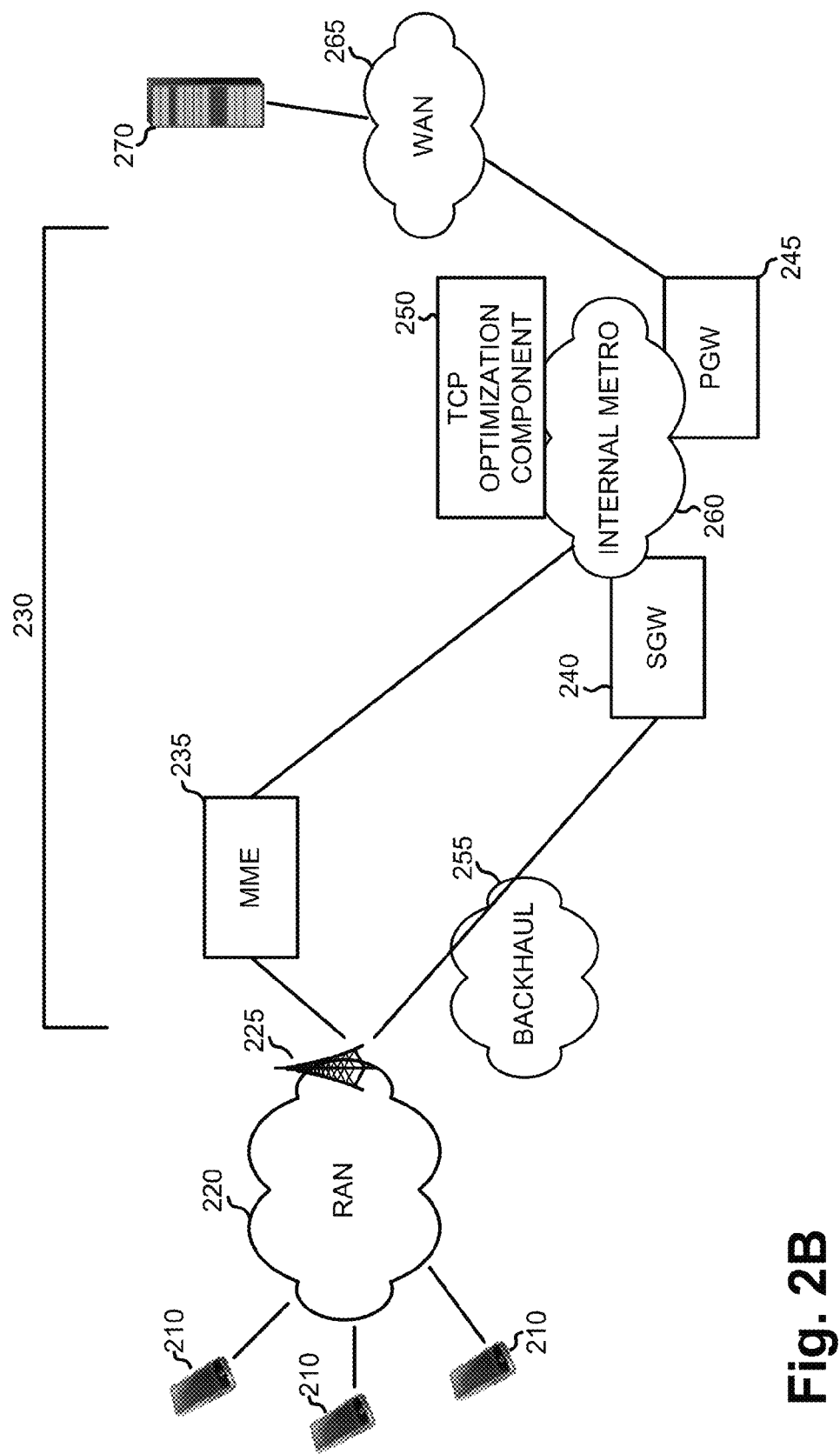
FIG. 2B is a diagram that illustrates a more detailed view of portions of the environment shown in FIG. 2A.

FIG. 2B is a diagram that illustrates a more detailed view of portions of example environment 200. In FIG. 2B, core network 230 may be a core network implemented using LTE technologies. As shown in FIG. 2B, core network 230 may include mobility management entity (MME) 235, serving gateway (SGW) 240, packet data network gateway (PGW) 245, and TCP optimization component 250. MME 235, SGW 240, PGW 245, and TCP optimization component 250 may be connected to one another, and to other devices, through one or more networks that are local to core network 230. For example, backhaul network 255, which may include an Ethernet backhaul network, may be used to connect eNodeB 225 to SGW 240. Similarly, internal metro network 260, which may include a service provider metro network or high speed optical core network, may be used to transport traffic between SGW 240, PGW 245, and TCP optimization component 250.

MME 235 may include one or more computation and communication devices that perform signaling for core network 230. MME 235 may, for example, be responsible for authenticating UEs 210, maintaining location information for UEs 210, and selecting a PGW 245 to service a particular UE 210. SGW 240 may include one or more computation and communication devices that route and forward user data packets. SGW 240 may also act as a mobility anchor during inter-eNodeB 225 handoffs. PGW 245 may include one or more computation and communication devices that provide connectivity from UEs 210 to external packet data networks.

As is further illustrated in FIG. 2B, PGW 245 may be coupled to WAN 265. WAN 265 may be an external packet data network, such as the Internet or another public or private network. Servers, such as server 270, and/or other devices, may be connected to WAN 265.

TCP optimization component 250 may include one or more computation and communication devices that process packet flows relating to TCP sessions, such as a TCP session established between UE 210 and server 270. TCP optimization component 250 may include or be included within, for example, a firewall, router, or other network device. TCP optimization component 250 may receive state information, relating to the congestion state of queues, from eNodeB 225. Based on the state information, and as described in further detail below, TCP optimization component 250 may determine whether to modify the TCP window field of a packet in a TCP session. For example, if the state information indicates that a queue, corresponding to the packet, is congested, the TCP congestion window field may be modified to indicate that a TCP congestion window parameter, used by server 270, should be decreased. In one implementation, TCP optimization component 250 may be implemented to process incoming packets at wireline speed.

Server 270 may include one or more computation and communication devices that provide data and/or computing services to connecting devices, such as to UEs 210. Server 270 may include, for example, a web server, a file server, or another type of server. In one implementation, when communicating with UEs 210, server 270 may use the TCP protocol.

Although TCP optimization component 250 is illustrated in FIG. 2B as a separate component, in some implementations, TCP optimization component 250 may be implemented as part of another network device, such as a functional component within PGW 245.

Although FIGS. 2A and 2B illustrate example components of environment 200, in other implementations, environment 200 may contain fewer components, different components, differently arranged components, or additional components than those depicted in FIG. 2. Alternatively, or additionally, one or more components of environment 200 may perform one or more other tasks described as being performed by one or more other components of environment 200.

Figure 3:
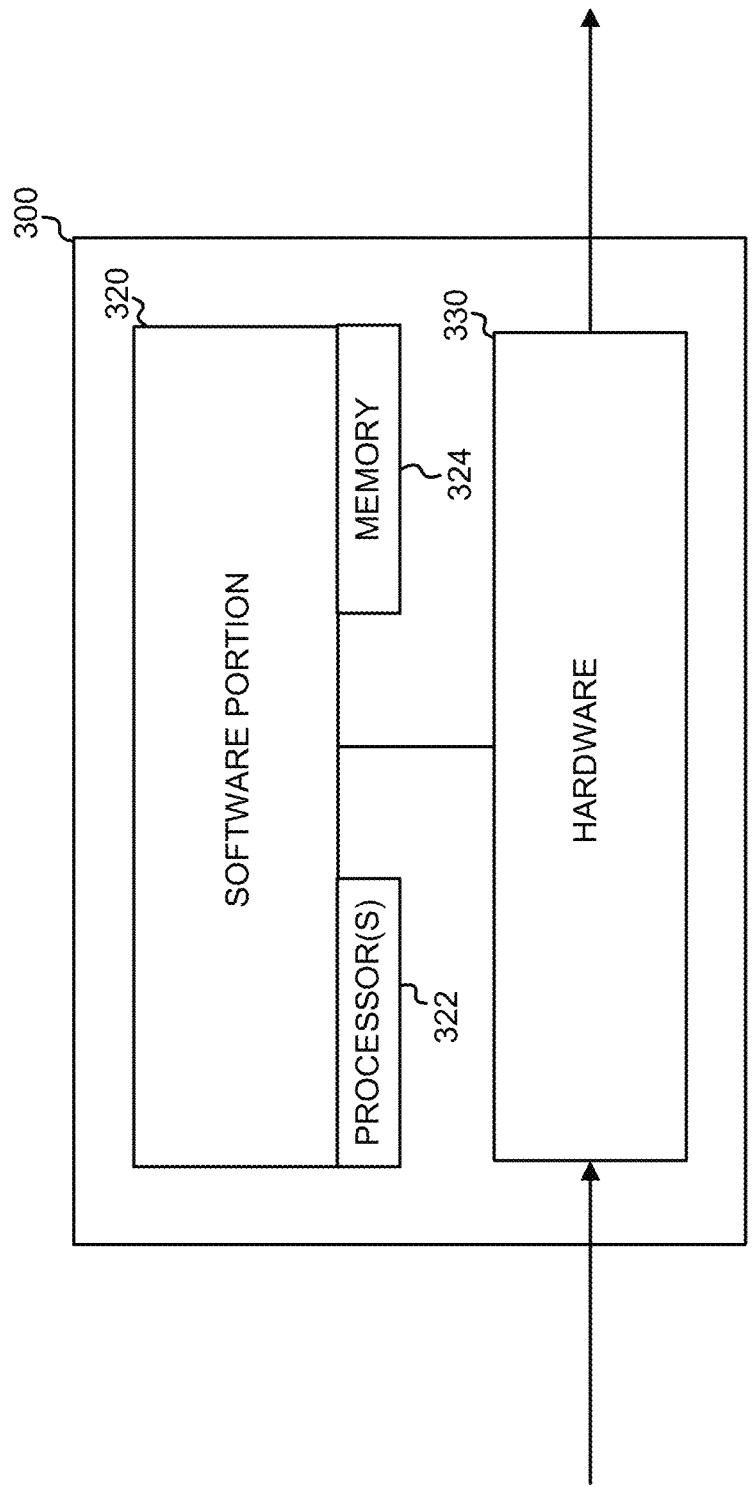
FIG. 3 is a diagram of an example implementation of a network device, such as one of the devices in the environment shown in FIGS. 2A and 2B.

FIG. 3 is a diagram of an example implementation of a network device 300, such as one of the devices in environment 200. Network device 300 may represent, for example, MME 235, SGW 240, PGW 245, and/or TCP optimization 250. Network device may 300 may generally operate to analyze and/or filter incoming packets and potentially modify one or more fields of the incoming packets before forwarding the packets towards the destinations of the packets. In order to increase throughput, network device 300 may use dedicated hardware to assist in processing network traffic. As shown in FIG. 3, network device 300 may generally include a software portion 320 and a hardware portion 330.

Software portion 320 may include software designed to control network device 300. In general, software portion 320 may implement the functions of network device 300 that are not time critical. The functions described as being performed by software portion 320 may be implemented through, for example, one or more general purpose processors 322 and one or more computer memories 324. Processors 322 may include processors, microprocessors, or other types of processing logic that may interpret and execute instructions. Computer memories 324 (also referred to as computer-readable media herein) may include random access memories (RAMs), read-only memories (ROMs), and/or other types of dynamic or static storage devices that may store information and instructions for execution by one or more processors 322. In general, software portion 320 may perform certain functions in response to processor(s) 322 executing software instructions contained in a computer-readable medium, such as memory 324. A computer-readable medium may be defined as a non-transitory memory device. A memory device may include space within a single physical memory device or spread across multiple physical memory devices.

Hardware portion 330 may include circuitry for efficiently processing traffic received by network device 300. Hardware portion 330 may include, for example, logic, such as an ASIC, an FPGA, and/or a content-addressable memory (CAM). Hardware portion 330 may receive incoming packets, extract header information for the packets, process the packets based on the extracted header information, and retransmit the packets on the way towards the final destination of the packets.

Although network device 300 is shown as including software portion 320 and hardware portion 330, network device 300 may, in some implementations, be implemented entirely through hardware. Additionally, network device 300 may include additional components, fewer components, different components, or differently arranged components than those illustrated in FIG. 3.

Figure 4:
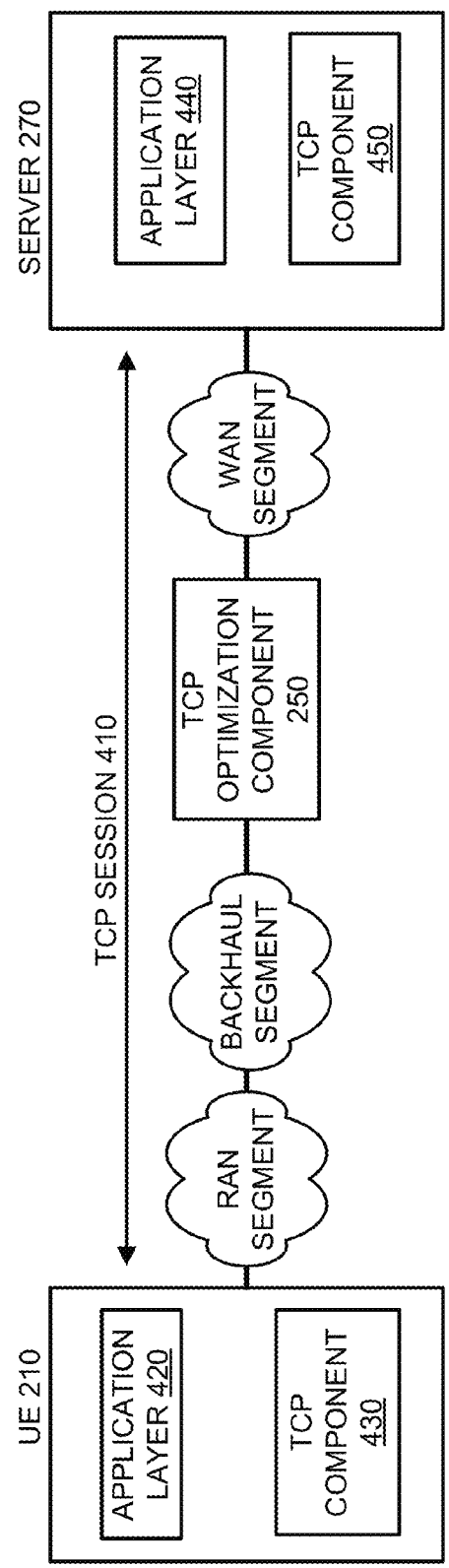
FIG. 4 is a diagram illustrating an example of functional components involved in communications performed using the TCP protocol.

FIG. 4 is a diagram illustrating an example of functional components involved in communications, performed using the TCP protocol, in environment 200. In FIG. 4, UE 210 and server 270 are illustrated as communicating with one another, via a TCP session 410. UE 210 may include application layer 420 and TCP component 430. Similarly, server 270 may include application layer 440 and TCP component 450.

Application layer 420, at UE 210, and application layer 440, at server 270, may represent one or more applications, such as applications that utilize network services. For example, at UE 210, application layer 420 may represent applications such as a web browser, or another program, that uses transport layer network services, such as TCP services. At server 270, application layer 440 may include web server applications or other programs that use transport layer network services, such as TCP services.

TCP component 430 and TCP component 450 may provide TCP services for UE 210 and server 270, respectively. During TCP session 410, TCP component 430 and TCP component 450 may communicate with one another, based on the TCP protocol, to provide reliable, ordered delivery of traffic via TCP session 410. Under the TCP protocol, a parameter, called the TCP window (RWIN), may be used by a sending device to provide an indication of the sending device's ability to receive data. For example, the TCP window may indicate the amount of data a first device (e.g., UE 210) can receive before acknowledging the received data. A second device (e.g., server 270) may use the value of the TPC window when controlling the flow of traffic to the first device. A value for the TCP window may be included in packets sent by the first device to a second device.

The transport channel for TCP session 410 may cover a number of different physical network segments. For example, referring to FIG. 2B, a TCP session between a UE 210 and server 270 may include a segment that traverses the radio interface ("RAN segment"), a segment that traverses backhaul network 255 ("backhaul segment"), and a segment that traverses WAN 265 ("WAN segment"). The various network segments may have different properties relating to reliability and latency. The RAN segment, for example, may be particularly subject to rapid variability in the quality of the radio link. Existing congestion control mechanisms for TCP may perform poorly when dealing with rapid variability of the quality of a network segment, such as a RAN segment.

TCP optimization component 250 may be implemented as a pass-through device with respect to TCP session 410. For example, all packets in a TCP session may be processed by TCP optimization component 250. In one implementation, TCP optimization component 250 may receive information relating to a congestion state of queues in eNodeB 225. Based on the congestion level of a queue corresponding to a particular TCP session, TCP optimization component 250 may modify the packets for the particular TCP session, such as by modifying the value for the TCP window field for the packets. For example, in response to detecting congestion in a queue corresponding to a TCP session between UE 210 and server 270, the TCP window value in a packet, in the TCP session, may be modified to lower the TCP window value. Server 270, in response to receiving the packet with the modified TCP window field, may update a flow control algorithm to reflect the new TCP window field that is associated with UE 210. In such a situation (in which the TCP window is reduced), server 270 may, in some implementations, reduce the amount of data transmitted to UE 210 before receiving an acknowledgement from UE 210.

Figure 5:
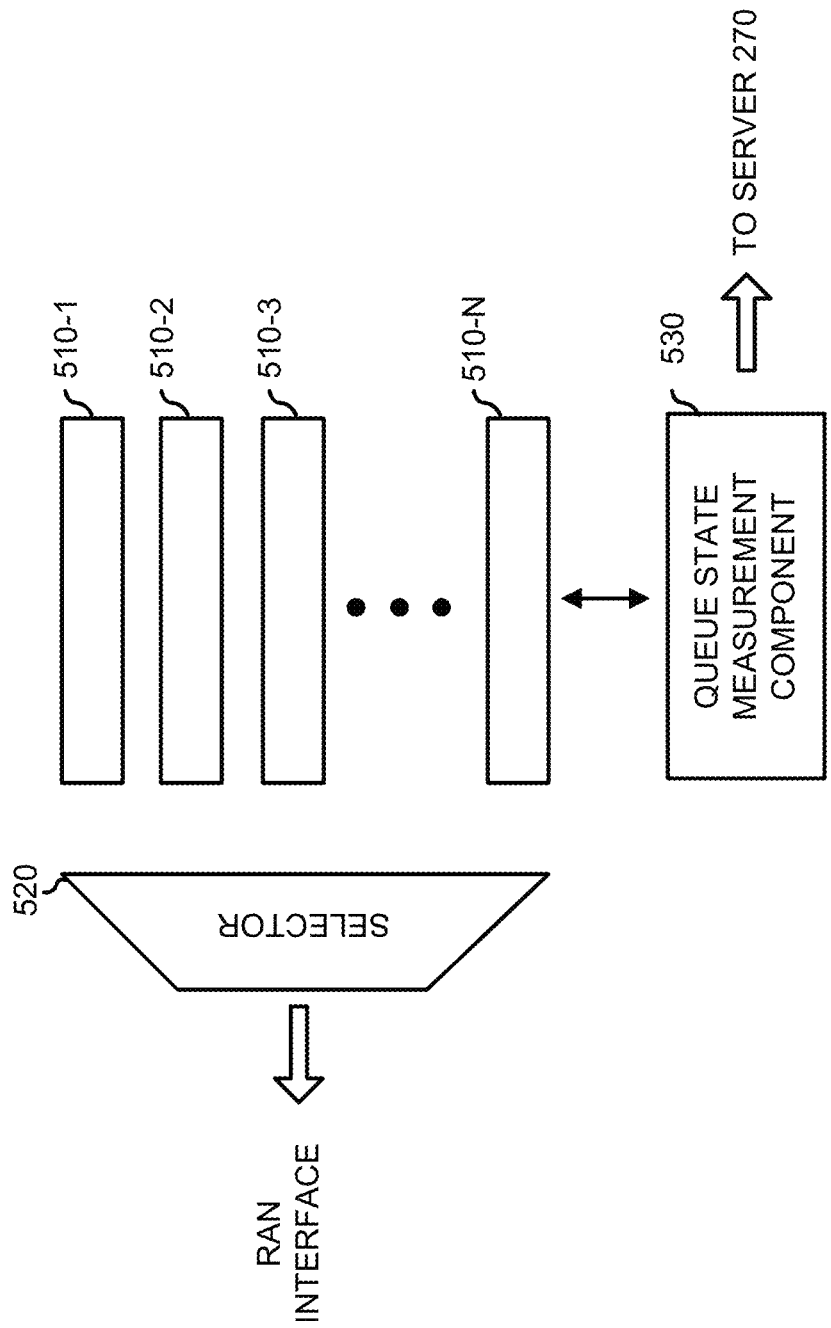
FIG. 5 is a diagram illustrating an example of functional components that may be included in an eNodeB.

FIG. 5 is a diagram illustrating an example of functional components that may be included in eNodeB 225. As shown, eNodeB 225 may include a number of queues 510-1 through 510-N (N>=1), selector component 520, and a queue state measurement component 530.

Each queue 510 may include a first-in first-out (FIFO) queue that is used to buffer incoming traffic, such as incoming packetized traffic, before the traffic is transmitted to the radio interface (RAN INTERFACE) of eNodeB 225. In one implementation, queues 510 may be implemented on a per-UE and per-QCI (Quality of Service (QoS) class identifier) basis. In this situation, eNodeB 225 may maintain one queue 510 for each traffic flow, of a particular class of service, for a UE 210. In other implementations, the queues 510 may be assigned differently by eNodeB 225. In some implementations, eNodeB 225 may not store information identifying the TCP session corresponding to a packet. For example, eNodeB 225 may maintain queues 510 on a per-bearer channel basis within core network 230, where a bearer channel may represent a communication channel in core network 230 corresponding to a particular UE and QCI, but may not be able to identify a particular queue with a particular TCP session.

Selector 520 may select traffic, such as packets, from queues 510, for transmission over the RAN interface. A number of selection techniques may be used by selector 520. For example, selector 520 may use a weighted round robin (WRR) technique, a weighted fair queuing (WFQ) technique, a low latency queuing (LLQ) technique, a weighted proportional fairness queuing technique, or other queuing techniques. In one implementation, the selection weightings used by selector 520 may be based on an assigned QCI value corresponding to a queue. For instance, higher priority queues 510 may be assigned higher weightings than lower priority queues 510, and thus the higher priority queues 510 may be selected more often and may therefore correspond to a higher bandwidth RAN interface.

Queue state measurement component 530 may determine state information, relating to a current capacity of each of queues 510. In one implementation, queue state measurement component 530 may output a multi-state value indicating a level of congestion for each queue (e.g., a one byte value indicating 256 possible states of congestion). In other implementations, queue state measurement component 530 may output, for each queue 510, a two-state (binary) value indicating whether a particular queue is congested or not congested. In another possible implementation, queue state measurement component 530 may output a three-state value for each queue indicating, for example, whether the congestion for the queue is below a first threshold, above a second threshold, or in between the first and second threshold.

Although FIG. 5 illustrates an example of functional components that may be included in eNodeB 225, in other implementations, eNodeB 225 may contain fewer components, different components, differently arranged components, or additional components than those depicted in FIG. 5. Alternatively, or additionally, one or more components of eNodeB 225 may perform one or more other tasks described as being performed by one or more other components of eNodeB 225.

Figure 6:
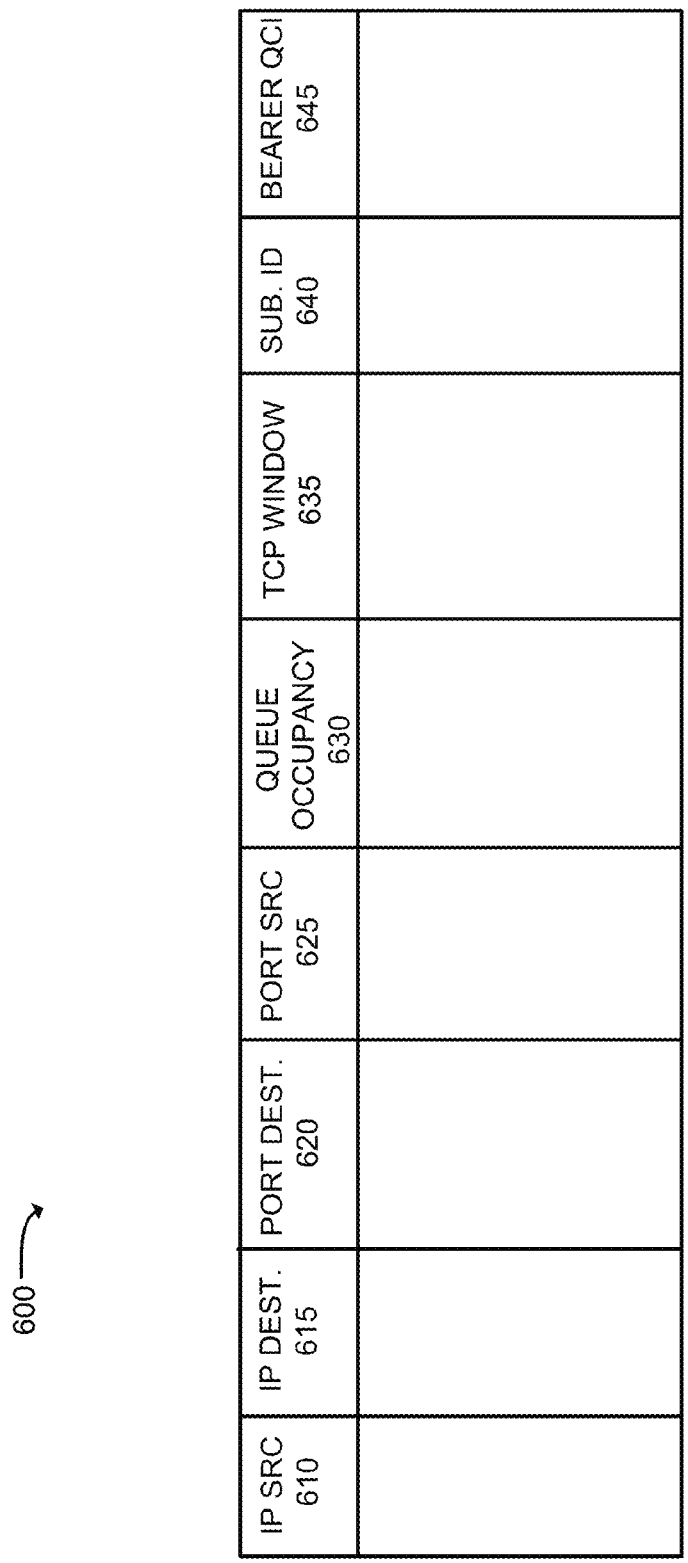
FIG. 6 is a diagram illustrating an example of a data structure that may be maintained by the TCP optimization component shown in FIG. 2B.

FIG. 6 is a diagram illustrating an example of a data structure 600 that may be maintained by TCP optimization component 250. Data structure 600 may be based on information obtained from a number of sources, such as queue congestion state information received from eNodeB 225. In some implementations, data structure 600 may additionally, or alternatively, be based on information obtained from other sources. For example, information correlating bearer channels to TCP sessions may be received from PGW 245 (or from another device in environment 200). The information from PGW 245 may be used to correlate the queue congestion state information to the TCP sessions, such that information identifying a TCP session (e.g., IP source and destination addresses and/or port numbers) may be used to look up the queue congestion state information for the particular TCP session.

As shown in FIG. 6, data structure 600 may include IP source (SRC) field 610, IP destination (DEST) field 615, port destination field 620, port source field 625, queue occupancy field 630, TCP window field 635, subscriber ID field 640, and bearer QCI field 645. In other implementations, data structure 600 may contain additional, fewer, or different fields than those illustrated FIG. 6.

IP source field 610, IP destination field 615, port destination field 620, and port source field 625 may collectively store the IP addressing information for a TCP session. Each entry in data structure 600 may correspond to a particular TCP session. In general, each TPC session may be associated, at each TCP terminating device (e.g., at UE 210 and server 270) with a pair of IP addresses. For example, for a TCP packet transmitted from UE 210 to server 270, the packet may include the IP address of UE 210 as the source IP address, corresponding to IP source field 610, and the IP address of server 270 as the destination IP address, corresponding to IP destination field 615. Packets transmitted from UE 210 may also be associated with a source port value, corresponding to port source field 625, and the destination port value, corresponding to port destination field 620. The values in field 610-625 may be collectively used, by TCP optimization component 250, to look up a TCP session associated with a packet. In some implementations, instead of storing the actual values of fields 610-625 in data structure 600, TCP optimization component 250 may derive a lookup key from fields 610-625, such as a lookup key contained by hashing fields 610-625. TCP optimization component 250 may use the lookup key to quickly identify a particular entry in data structure 600.

Queue occupancy field 630 may include information relating to the congestion state of queues 510. The values for queue occupancy field 630 may, in some implementations, be obtained from eNodeB 225. In one implementation, the queue congestion state information may be proactively transmitted, by eNodeB 125, to TCP optimization component 150, for all or a subset of queues 510. Alternatively or additionally, eNodeB 225 may transmit the queue congestion state information in response to requests from TCP optimization component 250.

TCP window field 635 may include values indicating, for each entry in data structure 600, the TCP window (RWIN) value that is to be used for the corresponding TCP session. The value of TCP window field 635 may be calculated by TCP optimization component 250 based on the value of queue occupancy field 630. For example, one or more threshold values may be set, such as by an administrator, of TCP optimization component 250. When queue occupancy field 630 exceeds the one or more threshold values, TCP optimization component may reduce the corresponding value in TCP window field 635 by a certain amount (e.g., 10%). Other techniques for determining the value of TCP window field 640 for a particular TCP session, based on queue occupancy field 630, may be used. In general, TCP optimization component 250 may determine the value of TCP window field 635 based on the goal to optimize the TCP packet flow based on the level of congestion indicated by queue occupancy field 630.

Subscriber identifier (ID) field 640 and bearer QCI field 645 may include information identifying the subscriber and the QCI value of the bearer channel in core network 230. As previously mentioned, in some implementations, queue congestion state information received from eNodeB 225 may associate the congestion state of queues 510 with information identifying the corresponding bearer channel in core network 230. This information may be stored in data structure 600 in subscriber ID field 640 and bearer QCI field 645.

Figure 7:
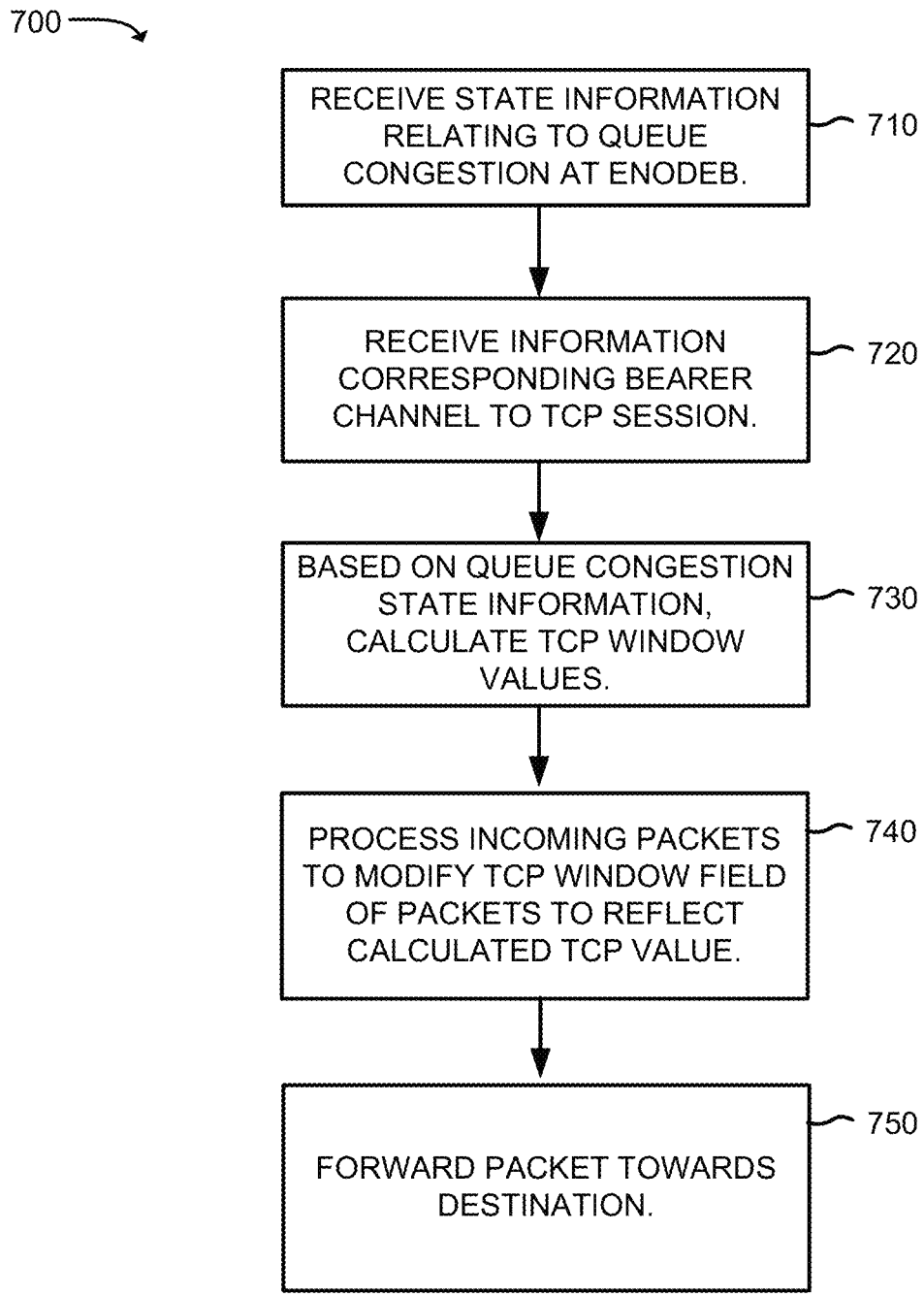
FIG. 7 is a flow chart illustrating an example process for optimizing traffic flow in TCP sessions.

FIG. 7 is a flow chart illustrating an example process 700 for optimizing traffic flow in TCP sessions. In one implementation, process 700 may be performed by TCP optimization component 250.

Process 700 may include receiving state information relating to the congestion state of queues at one or more eNodeBs (block 710). For example, as previously discussed, eNodeB 225 may broadcast or otherwise transmit the congestion state information to TCP optimization component 250. The congestion state information may, for example, describe a congestion state of each of a number of queues 510 that are maintained by eNodeB 225 as part of the transmission of packets, over a radio interface, to UEs 210.

In some situations, eNodeB 225 may not keep track of TCP sessions or may not be configured to correlate TCP sessions to particular queues 510. For example, eNodeB 225 may, for each queue 510, maintain information about the bearer channels, in core network 230, corresponding to queues 510. The information may include, for example, subscriber IDs and QCI levels corresponding to each queue 510. The subscriber ID/QCI values may also be received by TCP optimization component 250.

Process 700 may further include receiving information corresponding bearer channels to TCP sessions (block 720). For example, a network device, such as PGW 245, may have access to both bearer channel information (e.g., subscriber IDs and/or the corresponding QCI levels of the bearer channels) and TCP session information (e.g., source and destination IP address and port value pairs). PGW 245 may transmit this information to TCP optimization component 250. With the information from PGW 245 and eNodeB 225, TCP optimization component 250 may determine a correspondence between the congestion state at queues 510 and TCP sessions, which may allow TCP optimization component to associate incoming packets (associated with TCP sessions) to queues 510.

Process 700 may further include, based on the congestion state information relating to queues 510, calculating TCP window values (block 730). In one implementation, the calculated TCP window values may be values designed to optimize flow control, in a TCP session, in response to a current level of congestion in the corresponding queue 510. Because the level of congestion may directly relate to congestion in the RAN or to other factors that affect bandwidths through the radio interface, flow control in the TCP session may be controlled based on knowledge of the state of the radio interface for a particular TCP session.

As one possible example of the calculation of an updated TCP window value, consider the situation in which the queue state information relating to a particular queue indicates that a particular queue is 10% more congested than a predetermined "acceptable" level of congestion. In response, the TCP window value for the TCP session, corresponding to the queue, may be reduced by a particular amount (e.g., 10%, 20%, or some other amount). Reducing the TCP window value may subsequently cause, when the reduced TCP window value is received by server 270, server 270 to reduce the bandwidth of the data server 270 sends to UE 210 (e.g., by causing server 270 to send a reduced amount of data before receiving an acknowledgement from UE 210). It can be appreciated that numerous other techniques could potentially be used to calculate the updated TCP window values.

In some implementations, the calculation of the TCP window values (block 730) may be performed by software portion 320 of TCP congestion component 250. The calculated window values may be stored in a data structure, such as data structure 600, which may be used to quickly lookup the TCP window value corresponding to a particular TCP session (e.g., as identified by IP address and port information included in a packet).

Process 700 may further include processing incoming packets to modify the TCP window field of the packets to reflect the calculated TCP window values (block 740). For example, TCP optimization component 250 may extract the IP address information from each packet (e.g., the IP source address, the IP destination address, the source port value, and the destination port value) and use the IP address information to look up the corresponding TCP window value from data structure 600. In one implementation, the IP address information may be used to generate a key, such as a key generated via a hash operation on the IP address information, that indexes data structure 600. TCP optimization component 250 may use the looked-up window value to modify the TCP window value in the packet before the packet is transmitted from TCP optimization component 250. In some implementations, block 740 may be performed by hardware portion 330, of TCP optimization component 250, to obtain wirespeed or near-wirespeed operation.

Process 700 may further include forwarding the packets towards the destinations corresponding to the packets (block 740). The forwarded packets may include the packets in which the TCP window value is modified.

Figure 8:
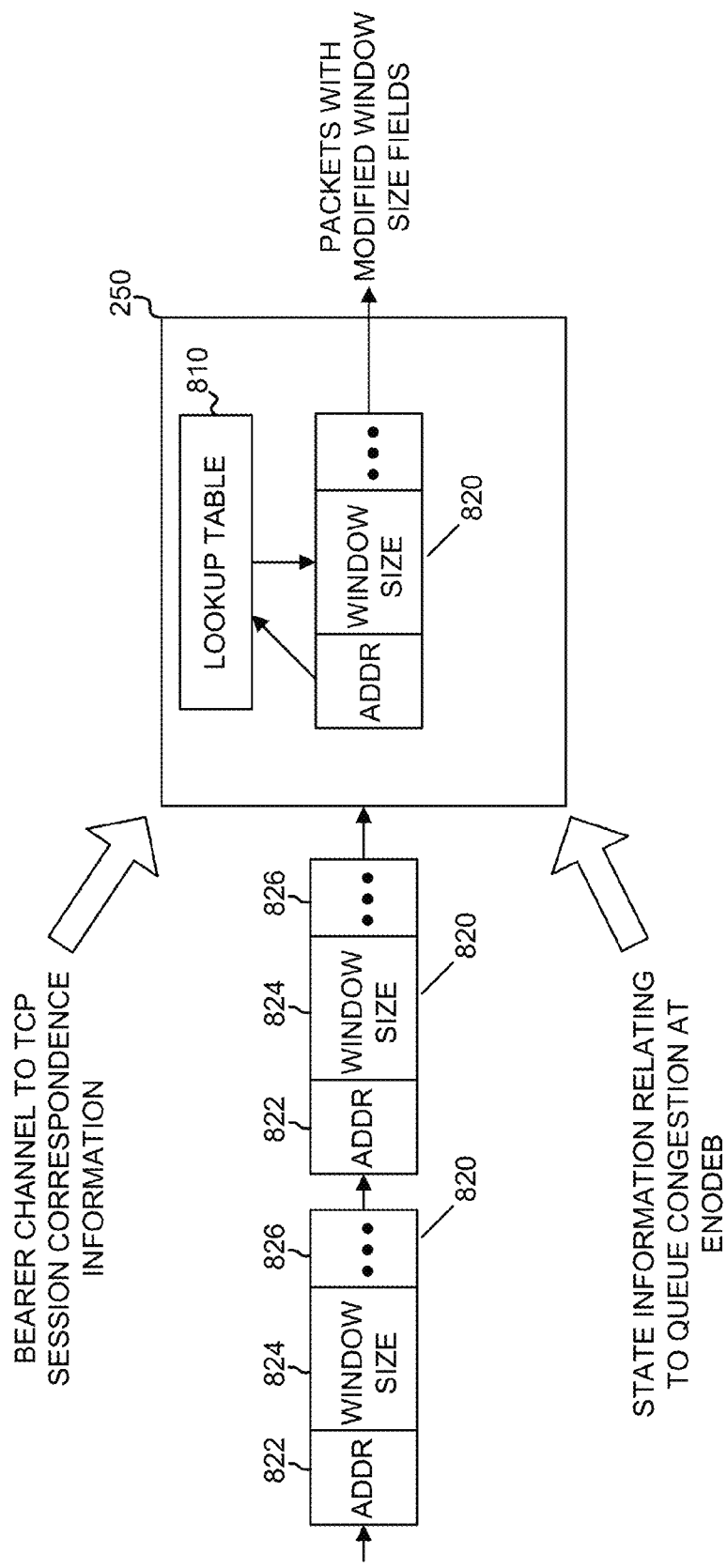
FIG. 8 is a diagram conceptually illustrating operation of one possible implementation of the TCP optimization component shown in FIG. 2B.

FIG. 8 is a diagram conceptually illustrating operation of one possible implementation of TCP optimization component 250.

As illustrated, TCP optimization component 250 may include lookup table 810, which may updated based on (1) state information relating to queue congestion at eNodeB 225, and (2) bearer channel to TCP session correspondence information. The state information relating to queue congestion at eNodeB 225 may be received from eNodeB 225 and the bearer channel to TCP session correspondence information may be received from PGW 245. Based on this information, TCP optimization component 250 may maintain lookup table 810 in which TCP session address information can be used to lookup a TCP window size parameter, where the TCP window size parameter may be adjusted based on congestion in the queue, at eNodeB 225, corresponding to the TCP session.

TCP optimization component 250 may receive and process incoming packets 820. Each packet 820 may include one or more address fields 822 (e.g., a source IP address and port value, and a destination IP address and port value), TCP window size field 824, and additional fields 826. The additional fields 826 may include, for example, additional packet header fields and/or the payload data for the packet.

For each packet 820, TCP optimization component 250 may extract address fields 822 from the packet and use the address fields to look up, via lookup table 810, an updated TCP window size for the packet. In situations in which the updated TCP window size is different than the TCP window size that is included in the incoming packet, TCP optimization component 250 may modify the packet to include the updated TCP window size. Adjusting the TCP window size for the packets in a TCP session that are being sent from UE 210 to server 270 may cause adjustments in the bandwidth of the packet flow, by server 270, in subsequent packets transmitted from server 270 to UE 210.

The address lookup and modification, as performed by TCP optimization component 250, and as shown in the example implementation of FIG. 8, may be implemented in hardware, such as through the use of an ASIC, FPGA, or network processor. Advantageously, TCP optimization component 250 may execute at wirespeed (or near wirespeed) and thus introduce relatively little latency into the TCP session. Additionally, due to the hardware implementation, the operation of TCP optimization component 250 may be scaled relatively easily. In contrast, other approaches to optimize TCP sessions that involve terminating TCP sockets at an intermediate device, may be associated with latency and scaling issues.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIG. 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
receiving, by a network device, state information relating to processing of traffic at a radio interface in a cellular network, the state information including information relating to a level of congestion at queues maintained by a base station in the cellular network, the state information being received from the base station;
receiving, by the network device, packets, associated with particular Transmission Control Protocol (TCP) sessions, transmitted by user equipment (UE);
receiving bearer channel information from a packet data network gateway (PGW) in the cellular network;
correlating the queues, maintained by the base station, to the particular TCP sessions, based on the received bearer channel information;
modifying, by the network device, a TCP window field of the received packets, the modification of the TCP window field being based on the state information and based on the correlation of the queues to the particular TCP sessions; and
forwarding, by the network device, the modified version of the packets towards a destination indicated by a destination address field of the packets.

2. The method of claim 1, wherein the cellular network includes a Long Term Evolution (LTE) network, and wherein the base station includes an Evolved Node B (eNodeB).

3. The method of claim 1, wherein the queues are maintained on a per-QCI (Quality of Service (QoS) class identifier) and per-bearer channel basis.

4. The method of claim 1, further comprising:
maintaining a lookup table at the network device; and
determining values for the modified TCP window field based on a lookup, into the lookup table, based on IP address and port values extracted from the packets.

5. The method of claim 1, wherein the received packets include packets within a TCP session between the UE and a server.

6. The method of claim 1, wherein the modification and forwarding of the packets are performed, by the network device, at wirespeed.

7. The method of claim 1, wherein the bearer channel information includes a subscriber identifier.

8. A network device comprising:
a memory device;
at least one processor to:
receive state information relating to processing of traffic at a radio interface in a cellular network, the state information including information relating to a level of congestion at queues maintained by a base station in the cellular network, the state information being received from the base station;
receive packets, associated with particular Transmission Control Protocol (TCP) sessions, transmitted by user equipment (UE) in the cellular network;
receive bearer channel information from a packet data network gateway (PGW) in the cellular network;
correlate the queues, maintained by the base station, to the particular TCP sessions, based on the received bearer channel information; and
maintain, based on the state information, a data structure that includes an optimized Transmission Control Protocol (TCP) window field value corresponding to a TCP session with the UE; and
a hardware component to:
look up, for a received one of the packets, an optimized TCP window field value from the data structure;
modify a TCP window field of the received one of the packets to include the looked-up optimized TCP window field value; and
forward the modified one of the packets towards a destination indicated by a destination address field of the modified one of the packets.

9. The network device of claim 8, wherein the cellular network includes a Long Term Evolution (LTE) network, and wherein the base station includes an Evolved Node B (eNodeB).

10. The network device of claim 8, wherein the queues are maintained on a per-QCI (Quality of Service (QoS) class identifier) and per-bearer channel basis.

11. The network device of claim 8, wherein the received packets include packets within a TCP session between the UE and a server.

12. The network device of claim 8, wherein the modification and forwarding of the packets are performed, by the hardware component, at wirespeed.

13. The network device of claim 8, wherein the bearer channel information includes a subscriber identifier.

14. A system comprising:
a base station in a cellular network to:
maintain a plurality of queues to buffer traffic destined for a radio interface; and
transmit state information relating to a congestion level of the plurality of queues; and
a network device to:
receive, from the base station, the state information;
receive packets, associated with particular Transmission Control Protocol (TCP) sessions, transmitted by user equipment (UE) connected to the base station;
receive bearer channel information from a packet data network gateway (PGW) in the cellular network;
correlate the queues, maintained by the base station, to the particular TCP sessions, based on the received bearer channel information;
modify a TCP window field of the received packets, the modification of the TCP window fields being based on the received state information; and
forward the modified packets towards a destination indicated by a destination address field of the modified packets.

15. The system of claim 14, wherein the cellular network includes a Long Term Evolution (LTE) network, and wherein the base station includes an Evolved Node B (eNodeB).

16. The system of claim 14, wherein the queues are maintained on a per-QCI (Quality of Service (QoS) class identifier) and per-bearer channel basis.

17. The system of claim 14, wherein the network device is further to:
maintain a lookup table; and
determine values for the modified TCP window field based on a lookup, into the lookup table, based on IP address and port values extracted from the packets.

18. The system of claim 14, wherein the received packets include packets within a TCP session between the UE and a server.

19. The system of claim 14, wherein the modification and forwarding of the packets, by the network device, are performed at wirespeed.

20. The system of claim 14, wherein the bearer channel information includes a subscriber identifier.

* * * * *